United States Patent Office 3,789,036
Patented Jan. 29, 1974

3,789,036
**PROCESS FOR PREPARING SATURATED AND UN-
SATURATED ELASTOMERIC COPOLYMERS OF
ETHYLENE AND/OR HIGHER ALPHA-OLEFINS**
Paolo Longi, Nazzareno Cameli, Alberto Valvassori,
Sandro Parodi, and Remo Cervi, Milan, Italy, assignors
to Montecatini Edison S.p.A., Milan, Italy
No Drawing. Filed Oct. 12, 1971, Ser. No. 188,493
Claims priority, application Italy, Oct. 13, 1970,
30,912/70
Int. Cl. C08f 15/04, 15/40
U.S. Cl. 260—80.7                                                8 Claims

ABSTRACT OF THE DISCLOSURE

There is disclosed a process for copolymerizing ethylene and/or higher alpha-olefins to elastomeric saturated copolymers, or for copolymerizing at least one of ethylene and higher alpha-olefins with hydrocarbons containing more than one double bond to elastomeric unsaturated, sulfur-vulcanizable copolymers in very high yields. The catalyst used is obtained by mixing (a) a hydride or organometallic compound of a metal belonging to Groups I to III of the Mendelyeev Periodic Table with (b) the product obtained by contacting a titanium compound with a support consisting of an anhydrous halide of magnesium, manganese or calcium in an active condition.

THE PRIOR ART

Various catalysts have been proposed for use in polymerizing ethylene and mixtures thereof with higher alpha-olefins and/or with hydrocarbons containing more than two double bonds.

The catalysts used most frequently in recent years for copolymerizing ethylene and/or higher alpha-olefins, in the absence or presence of diolefins to substantially amorphous copolymers have been prepared by mixing a vanadium compound with an organometallic derivative of a Groups I to III metal. The substantially amorphous copolymers thus obtained have valuable elastomeric characteristics in the vulcanized state.

However, the copolymer yields with respect to the amount of catalyst used are not very high.

Previous applications originating with our research group have disclosed catalysts which are very highly active in the polymerization of ethylene particularly, and consisting of the product obtained by mixing a hydride or organometallic compound of a Groups I to III metal with the product obtained by contacting titanium or vanadium compounds with a carrier consisting of an anhydrous halide of magnesium, managanese, zinc or calcium, the carrier being converted, before or during the contacting with Ti or V compound, to a particular active condition.

Those catalysts comprising the supported Ti or V compounds have the definite advantage over the conventional "Ziegler catalysts" of resulting in considerably higher polymer yields with respect to the amount of titanium or vanadium compound used and, most importantly, owing to the high polymer yields, of making it possible to avoid the need for subjecting the polymer obtained to a purification treatment for the removal of catalyst residues, at the end of the polymerization reaction. Another marked advantage of the said supported catalysts is that they may be used, without any appreciable decrease in activity, in the presence of hydrogen, zinc alkyls, and other chain-transfer agents which are used conventionally for regulating the molecular weight of the polymer formed.

THE PRESENT INVENTION

Unexpectedly, it is found that using catalysts consisting of the product obtained by mixing (a) hydrides or organometallic compounds of the Group I to III metals with (b) the product obtained by contacting a titanium compound with a carrier or support consisting of an anhydrous halide of Mg, Mn, or Ca, and in particular $MgCl_2$, $MgBr_2$, $MnCl_2$, $MnBr_2$, or $CaI_2$, in active condition, it is possible to obtain, in very high yields and therefore with all of the advantages enumerated herein, saturated elastomeric copolymers of ethylene and higher alpha-olefins of the formula $CH_2=CHR$ in which R is an alkyl radical containing 1 to 6 carbon atoms, or of said olefins with each other, as well as unsaturated elastomeric copolymers of ethylene with said higher alpha-olefins and with hydrocarbon monomers containing more than one double bond, if the copolymerization of the monomer mixtures in the liquid phase is carried out under conditions of high monomer concentrations.

In particular, there may be obtained by the present process, saturated elastomeric copolymers of ethylene with propylene, and/or butene-1, hexene-1, and 4-methylpentene-1, as well as unsaturated elastomeric copolymers of ethylene with propylene and with conjugated or non-conjugated dienes such as, for instance, butadiene-1,3-isoprene, hexadiene-1,4, dicyclopentadiene, ethylidennorborene, methyltetrahydroindene, decatriene-1,4,9,4-vinyl-cyclohexene cyclooctadiene-1,5 and so on.

The anhydrous halides of Mg, Mn and Ca may be used, also, in admixture with inert solid diluents selected from amongst the anhydrous compounds of metals belonging to Groups I to IV of the Mendelyeev Periodic System, without any appreciable decrease in the high activity of the catalyst. Particularly good results have been obtained by using silica as the inert diluent, which is interesting since silica as such, when used alone as support for the Ti compound, does not result in yields comparable to those we obtain even when the silica has a large surface area.

By "Mg, Mn or Ca halide in active form," as used herein, is meant the anhydrous halide in a form characterized in that, an its X-ray powder spectrum, the diffraction line which is most intense in the X-ray powder spectrum of the normal non-activated anhydrous halide is less intense and is replaced by a broadened halo; and/or in that the halide has a surface area greater than 5 m.$^2$/g. and up to about 150 m.$^2$/g.

For instance, in the case of anhydrous $MgCl_2$, the active forms are characterized in that, in its X-ray powder spectrum, the diffraction line at $d=2.56$ A. (which is the most intense line in the spectrum of the normal, non-active $MgCl_2$) is less intense and is replaced by a broadened halo, and/or said active forms of $MgCl_2$ have a surface area greater than 5 m.$^2$/g. and up to about 150 m.$^2$/g.

The Mg, Mn and Ca halides in the active form can be obtained by various methods. One of the most suitable methods consists in dissolving the anhydrous halides in alcohols, ethers or other anhydrous organic solvents, removing the major portion of the solvent by rapid evaporation, and then completing the removal of the solvent at reduced pressure and at temperatures higher than 100° C., and comprised, in particular, between 150° C. and 400° C.

Activated forms of the anhydrous Mg and Mn halides can also be obtained by very fine grinding and, in general, by any other mechanical method in which the halide particles are subjected to the action of frictional and/or sliding forces.

A presently preferred method for preparing the supported catalytic component consists in co-grinding mixture of the Ti compound with the anhydrous Mg, Mn or Ca halide, under conditions such that the halide is converted to the active form. Preferably, the grinding is carried out in a ball mill, operating in the dry state, in the absence of inert diluents.

The supported catalytic component can also be prepared by simply mixing, in the solid state, the Ti compound and the anhydrous Mg, Mn or Ca halide which is already in the active state as a result of pre-grinding thereof or of the method by which the active halide is produced.

In the case of Mg halides another suitable method for obtaining the active forms comprises starting from a Grignard reagent of the formula RMgX (wherein R is a hydrocarbon radical and X is a halogen atom) and either disproportioning said RMgX compound by known methods or decomposing it with a halogen containing compound such as gaseous hydrogen chloride. The active Mg halides obtained from the Grignard compounds generally show very high surface areas; for instance surface areas as high as 140–150 m.$^2$/g. can be attained.

The Ti compounds which may be fixed on the active Mg, Mn or Ca halide support in accordance with this invention include the halides, oxyhalides, haloalcoholates, alcoholates, the halo-titanates or the halo-titanites of ammonium and alkyl ammonium, or of the alkali metals, Ti-amides and Ti-haloamides. Ti salts of organic acids, Ti-alkyls and Ti-aryls, Ti-cyclopentadienyls, Ti-mercaptides, as well as the addition compounds of di-, tri-, and tetravalent Ti with electron donor compounds in which the electron donor atoms are, generally, N, P, O and S atoms, such as ethers, phosphines, amines and thioethers.

Other useful Ti compounds are those which can be obtained from the above-mentioned Ti compounds and from alcoholates and amides of the alkali metals, such as $LiTi(OC_3H_7)_2Cl_3$ and $LiTi(C_{12}H_8N)_4$, in which $(C_{12}H_8N)$ represents the carbazyl radical.

Typical examples of the Ti compounds which can be used in practicing this invention include:

$TiCl_4$, $TiCl_3$, $3TiCl_3 \cdot AlCl_3$, $TiI_4$, $Ti(OC_3H_7)Cl_3$, $Ti(OC_4H_9)_2Cl$, $Ti[O-C(CH_3)=CH-CO-CH_3]_2Cl_2$, $Ti[N(C_2H_5)_2]Cl_3$, $Ti[N(C_6H_5)_2]Cl_3$, $Ti[N(C_6H_5)_2]_4$, $(TiCl_3-OSO_2-C_6H_5)$, $Ti(C_6H_5COO)Cl_3$, $[N(C_4H_9)_4]_2$, $TiCl_6$, $[N(CH_3)_4]Ti_2Cl_9$, $TiBr_4 \cdot O(C_2H_5)_2$, $2TiCl_3 \cdot C_5H_5N$, $LiTi(OC_3H_7)_2Cl_3$, $LiTi(C_{12}H_8N)_4$ (lithium-titanium tetracarbazyl), $TiCl_3CH_3$, $TiCl_3C_5H_5$, $TiCl_3C_6H_5$, $TiCl_3C_6H_5S$, $Ti[SC_5N(C_6H_5)_2]_2Cl_2$.

The quantity of Ti compound used to prepare the supported catalytic component is comprised in a wide range, from less than 0.1% by weight with respect to the carrier, to 30% by weight, or higher.

Particularly good results, as to copolymer yield referred to both the Ti compound and carrier, are obtained when the amount of Ti fixed on the carrier is between 1% and 10% by weight.

Among the hydrides and organometallic compounds of the metals belonging to Groups I to III which are useful, the following are particularly suitable for preparing the catalyst: $Al(C_2H_5)_3$; $Al(iC_4H_9)_3$; $Al(C_2H_5)_2H$; $Al(iC_4H_9)_2H$; $Al(C_2H_5)_2Cl$.

The molar ratio between the organometallic compound or hydride and the Ti compound is not critical. However, it is preferably in the range 50 to 1,000.

The process of this invention involves, as already indicated, effecting copolymerization of the monomer mixtures in the liquid phase in the presence of the catalysts described herein and at high concentrations of the monomers to be copolymerized. Preferably, the copolymerization is effected in a mixture of the liquid monomers, in the absence of inert solvents. However, inert solvents can be present but only in quantities lower than 50% by weight with respect to the monomers.

Examples of the inert extraneous solvents which can be present in the relatively small amounts are the liquid aliphatic, aromatic, and cycloaliphatic hydrocarbons, such as n-hexane, n-heptane, benzene, toluene, xylene, cyclohexane, etc.

The amount of inert extraneous solvent present must be controlled and limited to less than 50% by weight on the monomers weight, since larger amounts of solvent drastically reduce the copolymer yield. This particular behavior of the catalysts used in the process according to the present invention is quite peculiar and surprising, inasmuch as with theta unsupported catalysts used previously in passing from a process carried out in large amounts of solvent to one carried out with the monomers in liquid condition did not involve any considerable variations in the copolymer yield.

The copolymerization under the conditions herein disclosed is carried out at temperatures generally comprised between −50° C. and 150° C., preferably between −20° C. and 80° C., and at either atmospheric or superatmospheric pressure.

The elastomeric ethylene/propylene copolymers are prepared by maintaining, in the liquid polymerization phase, a molar ratio of ethylene to propylene which is lower than or at most equal to 1:4.

The ethylene content of the binary copolymers is generally comprised between 20% and about 70% by weight.

The content of diene or polyene in the unsaturated copolymers is comprised between 0.1% and 2% by moles.

The molecular weight of the copolymers formed can be regulated during the copolymerization by operating in the presence of chain transfer agents such as, for instance, alkyl halides, organometallic compounds of Zn or Cd, or of hydrogen.

As is known, the activity of the conventional "Ziegler-type catalysts" obtained from transition metal compounds and organometallic compounds of the Groups I to III metals is considerably reduced by the presence, in the polymerization system, of hydrogen or other chain transfer agents used for regulating the molecular weight of the polymerizate.

It is an important aspect of this invention that the catalysts used in practicing it permit regulation of the molecular weight of the copolymers or terpolymers by means of hydrogen or other chain transfer agent to low and even very low values, without any appreciable decrease in the catalyst activity. Thus, it is possible to attain the marked advantage of regulating the molecular weight of the binary and ternary copolymers within a range of practical utility (corresponding to intrinsic viscosity values ranging from about 1.5 to 4 dl./g., in Tetralin at 135° C.) without a drop in the copolymer yield, on the quantity of catalyst used, to a value below which it would be necessary to subject the copolymer to special purifying treatments for the removal of catalyst residues from it, at the end of the copolymerization reaction. In fact, the Ti content of the copolymers as produced in this process is generally lower than 20 p.p.m.

The following examples are given to illustrate the invention and are not intended to be limiting. Unless otherwise specified, the percentages given in the examples are by weight. The intrinsic viscosities reported in the examples were measured in Tetralin at 135° C.; concentration: 0.25 g. of polymer in 100 cc. of solvent.

Example 1

10.21 g. of anhydrous $MgCl_2$, calcined at 450° C. for 48 hours in a gaseous HCl stream, and 0.53 g.

$Cl_3Ti(OC_3H_7)$ were ground in a nitrogen atmosphere for 64 hours at the temperature of 20° C. in a glass mill (length 100 mm. diameter 50 mm.) containing 550 g. of steel balls having a diameter of 9.5 mm.

Into a glass autoclave having a capacity of 750 cc., provided with a manometer, thermometer and stirrer and thermostated at −20° C., were introduced in the following order: 2 cc. Al(iC$_4$H$_9$)$_3$ diluted in 7 cc. of anhydrous n-heptane, 270 g. of propylene, ethylene up to a pressure of 3 atm. and 0.109 g. of the mixture consisting of Cl$_3$Ti(OC$_3$H$_7$) and MgCl$_2$, prepared as above-described, suspended in 20 cc. of n-heptane. During the test, the pressure was kept constant, by feeding ethylene again.

The test was interrupted after 4 hours by addition of 20 cc. of methanol. The polymer was purified by heat-treatment in a flask with a mixture of methanol-aqueous hydrochloric acid and subsequently with methanol up to neutrality. After drying under vacuum, 8.5 g. of product were obtained. The yield was of 7,000 g./g. Ti.

When subjected to infrared spectrography examination, the copolymer was found to contain 55% by weight of propylene. On X-ray examination, the copolymers showed a polyethylenic type crystallinity of 4.9%. The intrinsic viscosity was of 2.7 dl./g.

100 parts by weight of said copolymer were mixed on a roll mixer with 50 parts of HAF carbon black, 10.5 parts of Perkadox Bc40 (dicumyl peroxide at 40%) and 0.5 part of sulphur. The compound was vulcanized in a press at 165° C. for 40 minutes. A vulcanized small plate was obtained, which had the following characteristics:

Tensile strength, kg./cm.$^2$ _____ 218
Elongation at break, percent _____ 380
Modulus at 300%, kg./cm.$^2$ _____ 158
Residual deformation at break, percent _____ 6

Example 2

11.39 g. MgCl$_2$ prepared as described in Example 1 and 0.26 g. 3TiCl$_3$·AlCl$_3$ (obtained by the reduction of TiCl$_4$ with Al and activated by grinding) were ground at 20° C. for 16 hours in the apparatus described in Example 1. The surface area of the product was 26 m.$^2$/g.

Into the autoclave described in Example 1, thermostated at −20° C., were introduced in the following order: 2 cc. Al(iC$_4$H$_9$)$_3$ diluted in 7 cc. of n-heptane, 270 g. of propylene, ethylene up to a pressure of 3.2 atmospheres and 0.216 g. of the mixture consisting of 3TiCl$_3$·AlCl$_3$ and MgCl$_2$ suspended in 20 cc. of n-heptane. During the test the pressure was kept constant by feeding ethylene again.

The polymerization was interrupted after 4 hours by adding 20 cc. of methanol. The copolymer, purified and dried as described in Example 1, amounted to 23 g. The yield was of 20,000 g./g. Ti. On infrared examination, the copolymer was found to contain 55.5% by weight of propylene. The X-ray examination showed the presence of polyethylenic type crystallinity (4.3%). The intrinsic viscosity was 2.6 dl./g.

The copolymer was vulcanized as in Example 1. A vulcanized small plate was obtained, having the following characteristics:

Tensile strength, kg./cm.$^2$ _____ 232
Elongation at break, percent _____ 300
Modulus at 300%, kg./cm.$^2$ _____ 232
Residual deformation at break, percent _____ 5

Example 3

11.10 g. of anhydrous MgBr$_2$ calcined at 450° C. in a nitrogen atmosphere and 0.41 g. TiCl$_4$ were ground at 20° C. for 16 hours in the apparatus described in Example 1. The surface area of the product amounted to 24 m.$^2$/g.

An ethylene-propylene copolymerization test was carried out with the same apparatus and under the same conditions described in Example 1, using 0.110 g. of a mixture consisting of TiCl$_4$ and MgBr$_2$. The test was interrupted after 4 hours.

After purification and drying, 4.5 g. of copolymer were obtained (yield: 4,700 g./g. Ti), containing 48.5% by weight of propylene. The X-ray examination showed the presence of crystallinity of polyethylenic type (6.2%). The intrinsic viscosity was 3.9 dl./g.

100 parts of the copolymer were mixed on a roll mixer with 50 parts of HAF carbon black, 6.75 parts of Perkadox Bc40 (dicumyl peroxide at 40%) and 0.32 part of sulphur. The compound was vulcanized in a press at 165° C. for 40 minutes. The vulcanized small plate obtained had the following characteristics:

Tensile strength, kg./cm.$^2$ _____ 240
Elongation at break, percent _____ 400
Modulus at 300%, kg./cm.$^2$ _____ 161
Residual deformation at break, percent _____ 20

Example 4

8.17 g. MgCl$_2$ prepared as described in Example 1 and 0.41 g. TiCl$_4$ were ground at 20° C. for 16 hours in the apparatus described in Example 1. The surface area of the found product amounted to 25 m.$^2$/g.

418 g. of propylene were introduced into a 1.2 liters steel autoclave, provided with a manometer, a stirrer and a thermometer and thermostated at +16° C. Ethylene was fed up to a pressure of 9.7 atmospheres and subsequently the catalyst was added under nitrogen pressure, which was obtained by reacting, in 50 cc. of n-heptane, 2 cc. Al(iC$_4$H$_9$)$_3$ and 0.036 g. of the mixture consisting of TiCl$_4$ and MgCl$_2$. During the run, the pressure was kept constant by feeding ethylene again. The polymerization was interrupted after 4 hours. The dried product amounted to 143 g. (yield=398,000 g./g. Ti).

The copolymer contained 60.5% by weight of propylene and showed, when subjected to X-ray examination, 1.2% of polyethylenic type crystallinity. The intrinsic viscosity was 3.3 dl./g.

The copolymer, vulcanized with the compound and under the conditions described in Example 1, showed the following characteristics:

Tensile strength, kg./cm.$^2$ _____ 225
Elongation at break, percent _____ 460
Modulus at 300%, kg./cm.$^2$ _____ 130
Residual deformation at break, percent _____ 16

Example 5

30 g. of anhydrous MnCl$_2$ were dissolved in 100 cc. of anhydrous ethanol. The alcohol was rapidly evaporated and the residue was dried at 300° C. at a reduced pressure of 0.5 mm. Hg; 9.16 g. of MnCl$_2$ thus obtained and 0.41 g. TiCl$_4$ were ground at 20° C. for 16 hours in the apparatus described in Example 1.

544 g. of propylene were fed into a 2 liters autoclave, provided with a manometer, a stirrer and a thermometer and thermostated at 25° C. Ethylene was introduced up to a pressure of 11.8 atmospheres and subsequently the catalyst was added under nitrogen pressure; which was obtained by reacting, in 50 cc. of n-heptane, 2 cc. Al(iC$_4$H$_9$)$_3$ and 0.075 g. of the TiCl$_4$+MnCl$_2$ mixture. During the test, the pressure was kept constant by feeding ethylene again.

The polymerization was interrupted after 80 minutes by addition of methanol. After drying, 112 g. of polymer (yield: 143,000 g./g. Ti) were obtained. The copolymer contained 68% by weight of propylene and showed at the X-ray examination 9% of crystallinity of polypropylenic type. The intrinsic viscosity was of 2.5 dl./g.

The copolymer vulcanized with the compound and under the conditions described in Example 1, showed the following characteristics:

Tensile strength, kg./cm.$^2$ _____ 197
Elongation at break, percent _____ 310
Modulus at 300%, kg./cm.$^2$ _____ 190
Residual deformation at break, percent _____ 12

Example 6

9.7 g. of anhydrous $MgCl_2$ prepared as described in Example 1 and 0.41 g. $TiCl_4$ were ground at 20° C. for 64 hours in the apparatus described in Example 1.

480 g. of propylene were charged into a 3 liters autoclave provided with a manometer, stirrer and thermometer and thermostated at 60° C. Ethylene was fed up to a pressure of 26.6 atmospheres and subsequently the catalyst was added, under nitrogen atmosphere, which was obtained by reacting, in 50 cc. of n-heptane, 2 cc. $Al(iC_4H_9)_3$ and 0.047 g. of the $TiCl_4+MgCl_2$ mixture. During the test, the pressure was kept constant, by feeding ethylene again.

The polymerization was interrupted after 4 hours by addition of methanol. After drying, 217 g. of copolymer were obtained (yield=467,000 g./g. Ti).

The copolymer contained 68.5% by weight of propylene and showed on X-ray examination 12.4% of crystallinity of polypropylenic type. The intrinsic viscosity was of 2 dl./g. The copolymer, vulcanized by the compound and the procedures described in Example 1, showed the following characteristics:

Tensile strength, kg./cm.² _____ 206
Elongation at break, percent _____ 340
Modulus at 300%, kg./cm.² _____ 186
Residual deformation at break, percent _____ 14

Example 7

500 g. of propylene were fed into the autoclave described in Example 6, thermostated at 40° C. Ethylene was introduced to a pressure of 18.9 atm. and subsequently the catalyst obtained by reacting, in 50 cc. of n-heptane, 2 cm.³ $Al(iC_4H_9)_3$ and 0.052 g. of the mixture of $$3TiCl_3 \cdot AlCl_3 + MgCl_2$$

prepared according to the method described in Example 2 was added under nitrogen pressure. During the test, the pressure was kept constant by feeding ethylene again.

The polymerization was interrupted with methanol after 3 hours. 95 g. of polymer (yield=332,000 g./g.Ti) were obtained.

The copolymer contained 56.5% by weight of propylene and showed a crystallinity of 2.2% of polyethylenic type. The viscosity was 2.6 dl./g.

The copolymer, vulcanized as described in Example 1, showed the following characteristics:

Tensile strength, kg./cm.² _____ 162
Elongation at break, percent _____ 300
Modulus at 300%, kg./cm.² _____ 162
Residual deformation at break, percent _____ 6

Example 8

15.23 g. of anhydrous $MgCl_2$ prepared as described in Example 1 and 1.05 g. $Cl_3Ti[N(C_6H_5)_2]$ were ground at 20° C. for 36 hours in the apparatus described in Example 1. In the autoclave described in Example 6, thermostated at 40° C., 490 g. of propylene were fed and ethylene was introduced up to a pressure of 17.3 atm. Subsequently, under nitrogen pressure, the catalyst was added. It was obtained by reacting, in 50 cc. of n-heptane, 2 cc. $Al(iC_4H_9)_3$ and 0.059 g. of the $Cl_3Ti[N(C_6H_5)_2]+MgCl_2$ mixture. During the test, the pressure was kept constant by feeding ethylene again.

The polymerization was interrupted after 110 minutes. 163 g. of polymer were obtained (yield=290,000 g./g. Ti).

The copolymer contained 68.5% by weight of propylene and showed, when subjected to X-ray examination, a 7% crystallinity of polypropylenic type. The intrinsic viscosity was 2.25 dl./g.

The copolymer vulcanized by the compound and the procedures described in Example 1, showed the following characteristics:

Tensile strength, kg./cm.² _____ 191
Elongation at break, percent _____ 380
Modulus at 300%, kg./cm.² _____ 141
Residual deformation at break, percent _____ 16

Example 9

8.66 g. of anhydrous $MgCl_2$ prepared according to Example 1 and 1.04 g. $(C_2H_5)_4NTi_2Br_9$ were ground at 20° C. for 24 hours in the apparatus described in Example 1. The surface area of the product was 23 m.²/g.

In the autoclave described in Example 6, thermostated at 40° C., 490 g. of propylene were charged and ethylene was introduced up to a pressure of 17.8 atm. The catalyst, obtained by reacting, in 50 cc. of n-heptane, 2 cc.

$$Al(iC_4H_9)_3$$

and 0.074 g. of the mixture $(C_2H_5)_4NTi_2Br_9+MgCl_2$, was subsequently added under nitrogen pressure. During the test, the pressure was kept constant by feeding ethylene again.

The polymerization was interrupted after 30 minutes. 163 g. of polymer (yield=206,000 g./g. Ti) were obtained. The copolymer contained 62% by weight of propylene and showed at the X-ray examination a crystallinity of 8.1% of polypropylenic type. The intrinsic viscosity was 2.48 dl./g.

The copolymer, vulcanized by the compound and the procedures described in Example 1, showed the following characteristics:

Tensile strength, kg./cm.² _____ 227
Elongation at break, percent _____ 360
Moddulus at 300%, kg./cm.² _____ 176
Residual deformation at break, percent _____ 10

Example 10

12.51 g. of anhydrous $MgCl_2$ prepared according to Example 1 and 1.30 g. $TiCl_2[N(C_6H_5)_2]_2$ were ground at 20° C. for 36 hours in the apparatus described in Example 1.

In the autoclave described in Example 6, thermostated at 40° C., 510 g. of propylene and 70 cc. of dicyclopentadiene were fed and ethylene was introduced up to a pressure of 18.9 atm. The catalyst was subsequently added under nitrogen atmosphere; it was obtained by reacting, in 50 cc. of n-heptane, 2 cc. $Al(iC_4H_9)_3$ and 0.107 g. of the mixture $TiCl[N(C_6H_5)_2]_3+MgCl_2$.

After 60 minutes from the catalyst introduction, a further amount of 10 cc. of dicyclopentadiene, diluted in 20 cc. of heptane, was injected into the autoclave. During the test, the pressure was kept constant by feeding ethylene again.

The polymerization was interrupted after 3.5 hours by addition of methanol. The product was purified as described in Example 1, extracted with boiling methanol to remove the unreacted dicyclopentadiene and dried under vacuum.

60 g. of product (yield: 60,000 g./g. Ti) were obtained. On infrared examination, the terpolymer was found to contain 46% by weight of propylene and 1.9% by weight of dicyclopentadiene. At the X-ray examination, the terpolymer showed a crystallinity of 8.8% of polyethylenic type. The intrinsic viscosity was 2.45 dl./g.

Example 11

Into the autoclave described in Example 6, thermostated at 40° C., 515 g. of propylene and 35 cc. of 5-ethylidene-2-norbornene were fed and ethylene was introduced up to a pressure of 17.8 atm.

Subsequently, under nitrogen pressure, the catalyst was added. It was obtained by reacting 2 cc. of $Al(iC_4H_9)_3$ and 0.12 g. of the mixture consisting of $TiCl_4+MgCl_2$ (prepared according to the method described in Example 6) in 50 cc. of n-heptane. After 50 minutes from the catalyst introduction, a further amount of 5 cc. of ethylidennorbornene, diluted with 25 cc. of n-heptane, was injected into the autoclave. During the test, the pressure was kept constant, by feeding ethylene again.

The polymerization was interrupted after 1.5 hours. The polymer was extracted with boiling methanol, in order to remove the unreacted ethylidennorbornene, and subsequently dried under vacuum. 152 g. of product (yield 127,000 g./g. Ti) were obtained. The intrinsic viscosity was 1.8 dl./g.

When subjected to infrared examination, the terpolymer turned out to contain 66.5% by weight of propylene and 2.1% by weight of ethylidennorbornene. The X-ray examination showed the presence of crystallinity of polypropylenic type (11.3%).

Example 12

Into the autoclave described in Example 6, thermostated at 41° C., 500 g. of propylene and 52 g. of butadiene were fed and ethylene was introduced up to a pressure of 18.2 atmospheres.

The catalyst, obtained by reacting, in 50 cc. of n-heptane, 2 cc. Al(iC$_4$H$_9$)$_3$ and 0.41 g. of the TiCl$_4$+MgCl$_2$ mixture according to the method described in Example 6, was then fed in under nitrogen pressure. During the test, the pressure was kept constant, by feeding ethylene again.

The polymerization was interrupted after 1 hour. After drying, 139 g. of product (yield=34,000 g./g. Ti) were obtained; it contained 44% by weight of propylene and 2.2% by weight of butadiene. The X-ray examination showed the presence of 3.5% of polyethylenic type crystallinity. The intrinsic viscosity was of 3.0 dl./g.

Example 13

525 g. of propylene and 175 g. of butene-1 were fed into the autoclave described in Example 6, thermostated at 40° C., and ethylene was introduced up to pressure of 16.9 atmospheres.

The catalyst, obtained by reacting, in 50 cc. of n-heptane, 2 cc. Al(iC$_4$H$_9$)$_3$ and 0.115 g. of the

3TiCl$_3$.AlCl$_3$+MgCl$_2$ mixture prepared according to the method described in Example 2, was fed in under nitrogen pressure. During the test, the pressure was kept constant by feeding ethylene again.

The polymerization was interrupted after 3 hours. After drying, 214 g. of polymer were obtained (yield=356,000 g./g. Ti) containing 49% by weight of propylene and 13% by weight of butene. The intrinsic viscosity was 2.1 dl./g. The terpolymer appeared to be practically amorphous when subjected to X-ray examination.

The product, vulcanized by the compound and the procedures described in Example 1, showed the following characteristics:

Tensile strength, kg./cm.$^2$ _____ 184
Elongation at break, percent _____ 360
Modulus at 300%, kg./cm.$^2$ _____ 148
Residual deformation at break, percent _____ 7

Example 14

10.19 g. of anhydrous CaI$_2$, calcined at 350° C. for 4 hours, and 0.53 g. Cl$_3$Ti(OC$_6$H$_5$) were ground at 20° C. for 16 hours in the apparatus described in Example 1.

480 g. of propylene were fed into the autoclave described in Example 6, thermostated at 40° C., and ethylene was introduced up to a pressure of 18.9 atmospheres.

The catalyst was then added under nitrogen pressure; it was obtained by reacting, in 50 cc. n-heptane, 2 cc. of Al(iC$_4$H$_9$)$_3$ and 0.135 g. of the Cl$_3$Ti(OC$_6$H$_5$)+CaI$_2$ mixture. During the test, the pressure was kept constant by feeding ethylene again.

The polymerization was interrupted after 2.5 hours by addition of methanol. 50 g. of product (yield=37,800 g./g. Ti) were obtained. The copolymer contained 26% by weight of propylene and showed when subjected to X-ray examination a 5.7% crystallinity of polyethylenic type. The intrinsic viscosity was of 4.1 dl./g. The copolymer, vulcanized as described in Example 1, showed the following characteristics:

Tensile strength, kg./cm.$^2$ _____ 205
Elongation at break, percent _____ 240
Modulus at 200%, kg./cm.$^2$ _____ 143
Residual deformation at break, percent _____ 8

Example 15

In the autoclave described in Example 6, the thermostated at 40° C., 505 g. of propylene were introduced. Ethylene was fed up to a pressure of 17.3 atmospheres and subsequently, under nitrogen pressure, the catalyst was added; it was obtained by reacting, in 50 cc. of n-heptane, 2 cc. of Al(iC$_4$H$_9$)$_3$ and 0.131 g. of the Cl$_3$Ti(OC$_6$H$_5$)+CaI$_2$ mixture prepared according to the method described in Example 14. During the test, the pressure was kept constant by feeding ethylene again.

The polymerization was interrupted after 4 hours by addition of methanol. 35 g. of product (yield=27,300 g./g. Ti) were obtained. The copolymer contained 51% by weight of propylene and turned out to be amorphous on X-ray examination. The intrinsic viscosity was 2.3 dl./g. The copolymer, when vulcanized as described in Example 1, showed the following characteristics:

Tensile strength, kg./cm.$^2$ _____ 177
Elongation at break, percent _____ 300
Modulus at 300%, kg./cm.$^2$ _____ 177
Residual deformation at break, percent _____ 2

Example 16

The reaction apparatus was a glass cylinder having a capacity of 4,500 cc. and a diameter of 10 cm. and provided with a thermometer, a stirrer and outlet and inlet tubes for gases. The gas inlet tube extended to the bottom of the apparatus and terminated in a porous diaphragm.

In the apparatus, dipped into a thermostatic bath at +16° C., 3,000 cc. of anhydrous n-heptane were introduced. A propylene-ethylene mixture with a molar ratio of 2.5 was introduced through the gas inlet tube and circulated at at rate of 700 Nl./h. After 20 minutes of saturation, there were introduced under nitrogen atmosphere 2 cc. of Al(iC$_4$H$_9$)$_3$ and a suspension in n-heptane of 0.17 g. of the TiCl$_4$+MgCl$_2$ mixture, prepared according to the method described in Example 6. During the test, the propylene-ethylene mixture was continuously fed at a rate of 700 Nl./h.

The polymerization was interrupted after 4 hours by addition of 20 cc. of methanol. The product was purified in a separatory funnel by means of several treatments with aqueous hydrochloric acid and then with water, and finally it was coagulated with an acetone-methanol mixture. After drying, 21 g. of product (yield=12,700 g./g. Ti) were obtained. The propylene content was 65.5% by weight. The X-ray examination showed the presence of crystallinity of polyethylenic type (3.8%). The intrinsic viscosity was 2.1 dl./g. Vulcanized as described in Example 1, the copolymer had the following characteristics:

Tensile strength, kg./cm.$^2$ _____ 204
Elongation at break, percent _____ 400
Modulus at 300%, kg./cm.$^2$ _____ 137
Residual deformation at break, percent _____ 10

Example 17

5.99 g. of MgCl$_2$ (prepared as described in Example 1), 3.66 g. of NaCl (heated under vacuum at 400° C. for 3 hours) and 0.41 g. of TiCl$_4$ were ground at 20° C. for 24 hours in the apparatus described in Example 1. The surface area of the product was 34 m.$^2$/g.

In the autoclave described in Example 1, thermostated at −20° C., were introduced in this order: 2 cc. of $$Al(iC_4H_9)_3$$

diluted in 7 cc. of anhydrous n-heptane, 270 g. of propylene, ethylene up to a pressure of 3 atmospheres and 0.12 g. of the TiCl$_4$+MgCl$_2$+NaCl mixture, prepared as above described, suspended in 20 cc. of n-heptane. During the test, the pressure was kept constant by feeding ethylene again.

The test was interrupted after 4 hours by addition of 20 cc. of methanol. The copolymer, purified and dried as described in Example 1, amounted to 57 g (yield=52,000 g./g. Ti). The copolymer contained 54.5% by weight of propylene and showed, when subjected to the X-ray examination, a 4% crystallinity of polyethylenic type. The intrinsic viscosity was 2.5 dl./g. The copolymer, vulcanized with the compound described in Example 3, showed the following characteristics:

Tensile strength, kg. cm.² _____ 240
Elongation at break, percent _____ 540
Modulus at 300%, kg./cm.² _____ 77
Residual deformation at break, percent _____ 20

Example 18

581 g. of propylene were fed into the autoclave described in Example 5, thermostated at 23° C. Ethylene was introduced up to a pressure of 11.6 atmospheres and subsequently the catalyst was added under nitrogen pressure. It was obtained by reacting, in 25 cc. of n-heptane, 2 cc. of Al(iC$_4$H$_9$)$_3$ and 0.061 g. of the $$TiCl_4+MgCl_2+NaCl$$

mixture prepared according to the method described in Example 17. During the test, the temperature rose to 32° C. and the pressure was progressively increased up to 15.2 atmospheres by feeding ethylene again.

The test was interrupted after 2 hours. After drying, 275 g. of polymer (yield=450,000 g./g. Ti) were obtained. The copolymer contained 63% by weight of propylene and showed, when subjected to X-ray examination, a 6.6% crystallinity of polypropylenic type. The intrinsic viscosity was 2.1 dl./g. The copolymer vulcanized with the compound and under the conditions described in Example 3, showed the following characteristics:

Tensile strength, kg./cm.² _____ 185
Elongation at break, percent _____ 480
Modulus at 300%, kg./cm.² _____ 98
Residual deformation at break, percent _____ 22

Example 19

3.47 g. of MgCl$_2$ (prepared as described in Example 1), 6.9 g. of anhydrous SnCl$_2$ (obtained from SnCl$_2$.2H$_2$O by treatment with acetic anhydride) and 0.41 g. of TiCl$_4$ were ground at 20° C. for 16 hours in the apparatus described in Example 1.

In the autoclave described in Example 1, thermostated at −20° C., were introduced in the order: 2 cc. of $$Al(iC_4H_9)_3$$

diluted with 7 cc. of n-heptane, 270 g. of propylene, ethylene up to a pressure of 3 atmospheres and 0.123 g. of the TiCl$_4$+MgCl$_2$+SnCl$_2$ mixture, prepared as above described, suspended in 20 cc. of n-heptane. During the test, the pressure was kept constant by feeding ethylene again.

The test was interrupted after 4 hours. After purification and drying, 13.7 g. of product were obtained (yield=11,900 g./g. Ti.). The copolymer contained 45% by weight of propylene and showed on X-ray examination an 8% crystallinity of polyethylenic type. The intrinsic viscosity was of 2.6 dl./g. The vulcanizate of this copolymer, obtained as described in Example 1, had the following characteristics:

Tensile strength, kg./cm.² _____ 213
Elongation at break, percent _____ 400
Modulus at 300%, kg./cm.² _____ 123
Residue deformation at break, percent _____ 20

Example 20

4.75 g. of MgCl$_2$ (prepared as described in Example 1), 8.05 g. of PbCl$_2$ (dried by sublimation) and 0.41 g. of TiCl$_4$ were ground at 20° C. for 16 hours in the apparatus described in Example 1.

In the autoclave described in Example 1, thermostated at −20° C., were introduced in this order: 2 cc. of $$Al(iC_4H_9)_3$$

diluted with 8 cc. of n-heptane, 270 g. of propylene, ethylene up to a pressure of 3 atm. and 0.109 g. of the TiCl$_4$+MgCl$_2$+PbCl$_2$ mixture prepared as above described and suspended in 20 cc. of n-heptane. During the test, the pressure was kept constant, by feeding ethylene again.

The polymerization was interrupted after 4 hours. After purification and drying, 47 g. of product (yield=57,000 g./g. Ti) were obtained. The copolymer contained 56.5% by weight of propylene and showed, on X-ray examination, a polyethylenic type crystallinity of 3.2%. The intrinsic viscosity was 2.6 dl./g. The copolymer, vulcanized by the compound and the procedures described in Example 3, exhibited the following characteristics:

Tensile strength, kg./cm.² _____ 215
Elongation at break, percent _____ 510
Modulus at 300%, kg./cm.² _____ 84
Residual deformation at break, percent _____ 18

Example 21

1.7 g. of MgCl$_2$ (prepared as described in Example 1), 1.624 g. of SiO$_2$ (Syloid Al1 sold by W. R. Grace & Co.), calcined in a muffle at 1000° C. for 6 hours, and 0.14 g. of TiCl$_4$ were ground at 20° C. for 16 hours in the apparatus described in Example 1.

In the autoclave described in Example 1, thermostated at −20° C., there were introduced in the order: 2 cc. of Al(iC$_4$H$_9$)$_3$ diluted with 8 cc. of n-heptane, 270 g. of propylene, ethylene up to a pressure of 3 atm. and 0.109 g. of the mixture consisting of TiCl$_4$+MgCl$_2$+SiO$_2$ prepared as above described and suspended in 20 cc. of n-heptane. During the test, the pressure was kept constant by feeding ethylene again.

The polymerization was interrupted after 4 hours. After purification and drying, 88 g. of product (yield=79,000 g./g. Ti) were obtained. The copolymer contained 52.5% by weight of propylene and the X-ray examination showed the presence of 1.2% crystallinity of polyethylenic type. The vulcanizate of this copolymer, obtained as described in Example 1, had the following characteristics:

Ttensile strength, kg./cm.² _____ 238
Elongation at break, percent _____ 380
Modulus at 300%, kg./cm.² _____ 164
Residual deformation at break, percent _____ 6

It is a facet of this invention that using the anhydrous Mg, Mn or Ca halides specifically, in the active form as defined herein, as supports or carriers, it is possible to obtain, using various Ti compounds, elastomeric saturated binary copolymers and elastomer unsaturated ternary copolymers which are substantially amorphous and vulcanizable to synthetic rubbers having commercially acceptable properties which are competitive with the vulcanizable binary and ternary copolymers heretofore obtained using catalyst based on hydrocarbon-soluble vanadium compounds.

As will be apparent, changes in details can be made in practicing the invention, as to the selection of the particular Ti compound, the hydride or organometallic derivative of the Groups I to III metal, the choice of support from among the anhydrous Mg, Mn and Ca halides in the active state, and so on, without departing from the spirit of the invention. Therefore, we intend to include in the scope of the appended claims all such modifications as will be obvious to those skilled in the art from the description and working examples given herein.

We claim:

1. A process for preparing saturated elastomeric copolymers of ethylene and higher alpha-olefins of the formula $CH_2=CHR$ in which R is an alkyl radical containing from 1 to 6 carbon atoms; such copolymers of said higher alpha-olefins with each other; and unsaturated elastomeric copolymers of ethylene, said higher alpha-olefins, and hydrocarbon monomers containing more than one double bond, which process comprises copolymerizing the mixed starting monomers in a liquid medium at least 50% by weight of which is formed by the monomers to be copolymerized, and in contact with a catalyst prepared by mixing (a) a hydride or organometallic compound of a metal belonging to Groups I, II or III of the Mendeleev Periodic System with (b) the product obtained by contacting a titanium compound selected from the group comprising the halogenated Ti-compounds, the Ti-alcoholates, Ti-amides, Ti-salts of organic acids, Ti-mercaptides with an anhydrous dihalide of Mg, Mn or Ca which, during or prior to the contacting is converted to an active form characterized in that the diffraction line in its X-ray powder spectrum which is most intense in the X-ray powder spectrum of the normal, inactive Mg, Mn or Ca halide is replaced by a broadened halo; and/or in that said active Mg, Mn or Ca halide has a surface area greater than 5 m.²/g. and up to about 150 m.²/g.

2. The process according to claim 1, in which the titanium compound is in the form of an addition compound with the electron donor compound containing electron donor atoms selected from O, P, N and S.

3. The process according to claim 1, in which the mixed monomers are copolymerized in the absence of inert solvents.

4. The process according to claim 1, in which the monomers copolymerized are ethylene and propylene.

5. The process according to claim 1, in which the monomers copolmmerized are ethylene, propylene and a third monomer selected from linear and cyclic unsaturated hydrocarbons containing at least two double bonds.

6. The process according to claim 1, in which the monomers copolymerized are ethylene, propylene and a third monomer selected from the group consisting of butadiene-1,3 - isoprene, hexadiene-1,4-dicyclopentadiene, ethylidennorbornene, methyltetrahydroindene, decatriene - 1,4,9,4-vinylcyclohexene and cyclooctadiene-1.5.

7. The process according to claim 1, in which the carrier for the Ti compound consists of a mixture of an active anhydrous dihalide of Mg, Mn or Ca with a compound of a metal belonging to Groups I to IV of the Mendelyeev Periodic System.

8. The process according to claim 1, in which the carrier for the Ti compound consists of a mixture of an active anhydrous dihalide of Mg, Mn or Ca with a solid diluent selected from the group consisting of NaCl, $PbCl_2$, $SnCl_2$ and silica.

References Cited

UNITED STATES PATENTS

| | | | |
|---|---|---|---|
| 2,981,725 | 4/1961 | Luft | 260—93.7 |
| 3,008,943 | 11/1961 | Guyer | 260—93.7 |
| 3,238,146 | 3/1966 | Wewitt | 252—441 |
| 3,252,960 | 5/1966 | Tornqvist | 260—93.7 |
| 3,624,059 | 11/1971 | Bloyaert | 260—88.2 |

OTHER REFERENCES

Chemical Abstracts, vol. 73:67050s, Olefin Polymerization Catalysts Containing Activated Titanium and Magnesium Chlorides (1970) citing Ger. Offen. 1,958,046.

Chemical Abstracts, vol. 73, 1970 73:35929u, Catalysts for Polymerization of Ethylene citing Ger. Offen. 1,958,-488.

Chemical Abstracts, vol. 73:121062n (1970), Olefin Polymerization Catalysts citing Ger. Offen. 2,013,730.

Chemical Abstracts, vol. 74:64609r, Ethylene Polymerization Catalysts Containing Titanium and Magnesium Chlorides citing Ger. Ocen. 2,029,992.

JOSEPH L. SCHAFER, Primary Examiner

A. HOLLER, Assistant Examiner

U.S. Cl. X.R.

260—80.78, 88.2 R

UNITED STATES PATENT OFFICE
CERTIFICATE OF CORRECTION

Patent No. 3,789,036      Dated January 29, 1974

Inventor(s) Paolo LONGI et al

It is certified that error appears in the above-identified patent and that said Letters Patent are hereby corrected as shown below:

Col. 1, line 53, " managanese " should be - - - manganese - - -;

line 55, - - - the - - - should appear before " Ti ".

Col. 2, line 3, " Group " should be - - - groups - - -;

lines 27 - 28, " ethylidennorborene " should be - - - ethylidennorbornene - - -;

line 42, " an " before " its " should be - - - in - - -;

lines 70 - 71, " mixture " should be - - - mixtures - - -.

Col. 4, line 10, " theta " should be - - - the - - -;

line 27, " 2% " should be - - - 20% - - -.

Col. 7, line 9 of Example 8, the formula " $Cl_3Ti[N(_6H_5)_2]$ " should be - - - $Cl_3Ti[N(C_6H_5)_2]$ - - -

Col. 10, line 1 of Example 15, " the " before " thermo- " should be deleted;

line 10 of Example 16, " at " before " rate " should be - - - a - - -.

Col. 12, line 29 of Example 21, " elastomer " should be - - - elastomeric - - -;

UNITED STATES PATENT OFFICE
CERTIFICATE OF CORRECTION

Patent No. 3,789,036            Dated January 29, 1974

Inventor(s) Paolo LONGI et al

It is certified that error appears in the above-identified patent and that said Letters Patent are hereby corrected as shown below:

PAGE #2

Col. 12, line 34 of Example 21, " catalyst " should be - - - catalysts - - -.

Col. 13, line 3 of Claim 2, after " with " the word " the " should be - - - an - - -;

line 2 of Claim 5, " copolmmerized " should be - - - copolymerized - - -.

Col. 14, in the list of references cited, " Wewitt " ( 3rd item ) should be - - - Hewett et al - - -;

last line, " German Ocen. " should be - - - German Offen. - - -.

Signed and sealed this 14th day of January 1975.

(SEAL)
Attest:

McCOY M. GIBSON JR.
Attesting Officer

C. MARSHALL DANN
Commissioner of Patents